April 5, 1938.  M. P. HOLMES  2,112,843
TRANSMISSION
Original Filed March 29, 1930  2 Sheets-Sheet 1

Inventor:
Morris P. Holmes.
by Luis A. Maxon.
atty.

April 5, 1938.　　　　M. P. HOLMES　　　　2,112,843
TRANSMISSION
Original Filed March 29, 1930　　2 Sheets-Sheet 2
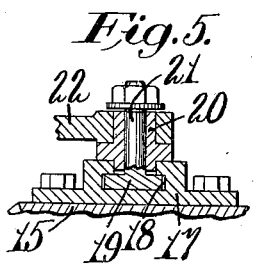
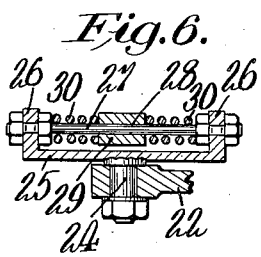
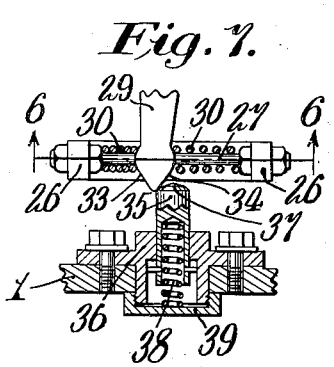
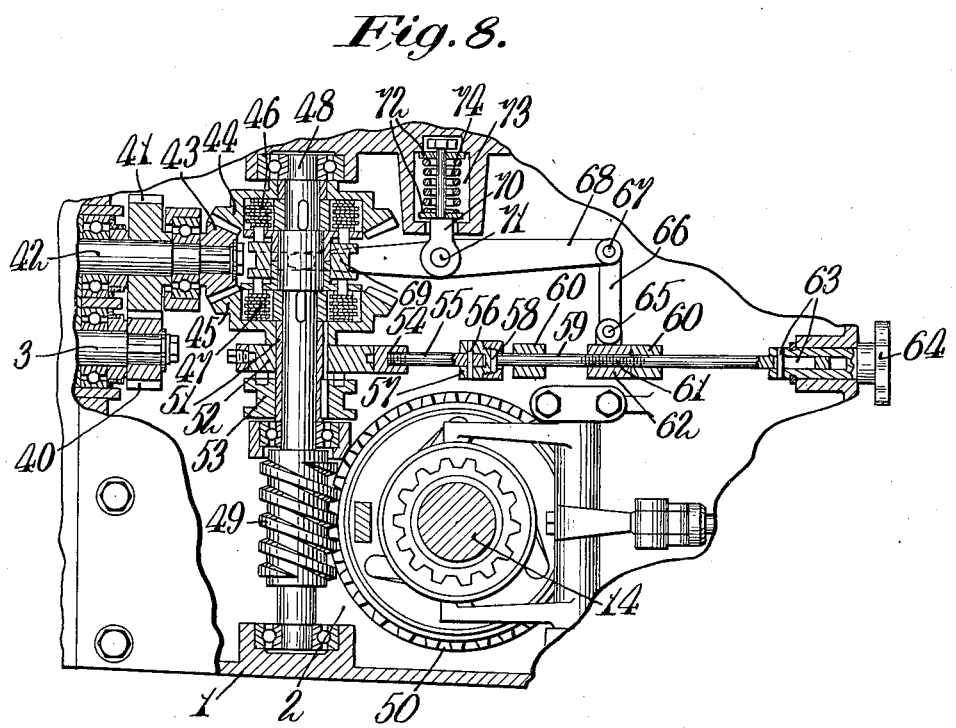
Inventor:
Morris P. Holmes.
by
Louis A. Maxton.
atty.

Patented Apr. 5, 1938

2,112,843

UNITED STATES PATENT OFFICE 2,112,843

TRANSMISSION MECHANISM

Morris P. Holmes, Claremont, N. H., assignor to Sullivan Machinery Company, a corporation of Massachusetts Original application March 29, 1930, Serial No. 440,089. Divided and this application May 29, 1933, Serial No. 673,493

12 Claims. (Cl. 74—324)

This invention relates to transmission mechanism, and more particularly to improvements in a variable speed, speed reducing mechanism.

An object of this invention is to provide an improved transmission mechanism. Another object is to provide an improved transmission mechanism wherein clutch means is employed and improved operating means for the clutch means. A further object is to provide an improved variable speed, speed reducing mechanism. Still another object is to provide an improved transmission mechanism wherein a plurality of reversible clutch means are employed and improved operating means for the clutch means whereby the terminal element of the transmission is oscillated by intermittent application of the clutch means. A further object is to provide an improved clutch operating means driven by an element actuated by the oscillatory terminal element of the transmission mechanism. A still further object is to provide in such a transmission mechanism a friction power transmission clutch and improved means for automatically loading the clutch at predetermined timed intervals, the clutch loading means driven from an element of the transmission drive. Still another object is to provide in such a transmission mechanism a friction power transmission clutch, loading means for said clutch including a yielding connection, together with means for intermittently tensioning said yielding connection to an extent sufficient to effect drive of the driven element. A further object is to provide improved means for variably tensioning aforesaid yielding connection thereby variably to load said clutch to effect intermittent drive therethrough at variable speeds. These and other objects and advantages of the invention will, however, hereinafter more fully appear.

This application is a division of my copending application Serial No. 440,089, filed March 29, 1930.

In the accompanying drawings there are shown for purposes of illustration two forms which the invention may assume in practice.

In these drawings,—

Fig. 5 is a detail sectional view taken on line 5—5 of Fig. 1.

Figs. 6 and 7 are detail sectional views illustrating a portion of the clutch controlling mechanism, Fig. 6 being taken on line 6—6 of Fig. 7.

Fig. 8 is a view similar to Fig. 1 showing a modified form of construction.

Figure 1:
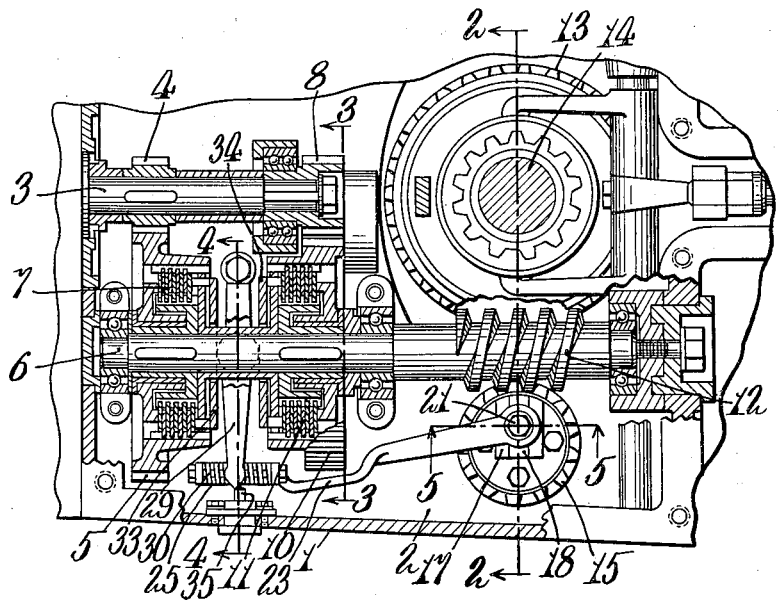
Fig. 1 is a horizontal sectional view of one illustrative embodiment of the improved transmission mechanism.

In the illustrative form of the improved transmission mechanism shown in Figs. 1 to 7, inclusive, there is shown a casing 1 having a chamber 2 housing the improved transmission gearing. Keyed to a motor power shaft 3 is a spur pinion 4 meshing with a spur gear 5 journaled on a horizontal longitudinally extending shaft 6 and herein arranged parallel with the motor power shaft 3 and suitably journaled within the casing 1. The spur gear 5 is connectible to the shaft 6 by a multiple disc clutch 7. Also secured to the motor power shaft 3 is a spur pinion 8 meshing with an intermediate gear 9 (see Fig. 3) in turn meshing with a spur gear 10. This spur gear is likewise journaled on the shaft 6 and is likewise connectible to the shaft by a multiple disc clutch 11. It will thus be seen that upon alternative application of the disc clutches 7, 11 the shaft 6 may be driven in either of opposite directions. Keyed to the shaft 6 at the rear end thereof is the terminal driving element of the transmission mechanism, herein a worm 12 meshing with a worm wheel 13. As the terminal worm element of the transmission is oscillated upon intermittent application of the disc clutches 7, 11, the worm wheel 13 is likewise oscillated and effects intermittent rotary drive through a ratchet and pawl device, as described in my copending application mentioned above, of a vertical shaft 14 arranged coaxially with the worm wheel 13.

Figure 2:
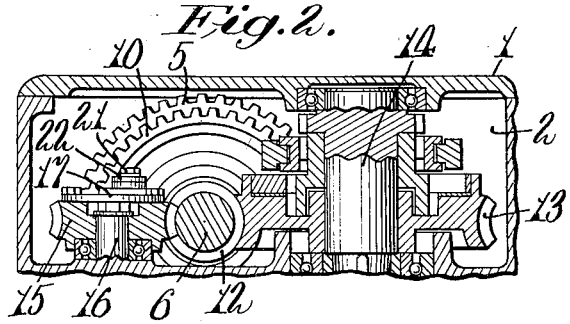
Fig. 2 is a cross sectional view taken substantially on line 2—2 of Fig. 1.
Figure 3:
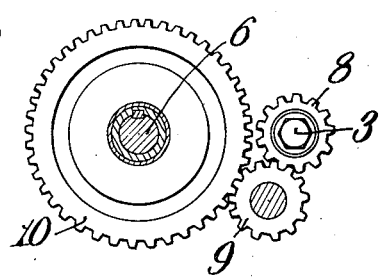
Fig. 3 is a cross sectional view taken on line 3—3 of Fig. 1.
Figure 4:
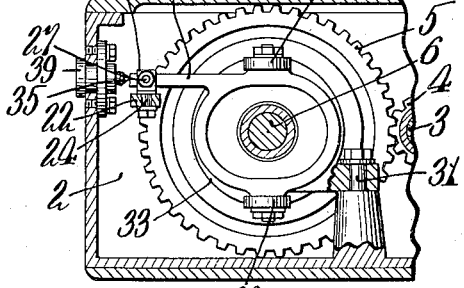
Fig. 4 is a cross sectional view taken substantially on line 4—4 of Fig. 1.

The mechanism for effecting oscillation of the terminal worm element of the transmission is associated with the improved operating mechanism for the disc clutches 7 and 11 and herein includes, in the form of the invention shown in Figs. 1 to 7, a worm wheel 15 journaled, as shown in Fig. 2, on a vertical stud 16 and meshing with the worm 12. Secured to the upper surface of the worm wheel 15 is a guide member 17 having a radial guideway 18, and mounted within this guideway is a slide 19 carrying a crank pin 20 having its axis vertically disposed. The crank pin 20 may be adjusted toward or from the axis of the worm wheel 15 to vary its throw and may be secured in any of its adjusted positions by a clamping bolt 21. Connected to the crank pin 20 is a link or connecting rod 22. As shown in Fig. 1, this connecting rod is outwardly bent at 23 to clear the spur gear 10, and is pivotally connected at 24 (see Fig. 6) to a member 25. The ends of the member 25 have upstanding perforated ears or lugs 26, and passing through the openings in these lugs is a horizontal bolt or guide pin 27. Slidably connected at 28 to this bolt is a shipper arm 29. Interposed between the opposite sides of this arm and the lugs 26, 26 and surrounding the bolt 27 are coil springs 30, 30. It will thus be seen that the member 25, the bolt 27 and the coil springs form a resilient or yielding connection between the connecting rod 22 and the pivoted shipper arm 29 for the disc clutches. As shown in Figs. 1 and 4, the shipper arm 29 is pivoted at 31 within the casing 1 and is equipped with rollers 32, 32 engageable with plane surfaces of cylindrical clutch applying plates 33 and 34 for the disc clutches 7 and 11, respectively, as shown in Fig. 1. As illustrated, the outer end of the shipper arm 29 is provided with inclined or rounded converging surfaces 33 and 34, and engageable with these surfaces is a spring pressed plunger 35 guided within a bore formed in a plate 36 secured to the inner side wall of the transmission casing. This plunger is provided with a conical end 37 engageable with the inclined surfaces 33 and 34, and the tension of its spring 38 may be regulated by an adjustable cap plate 39 threadedly connected to the plate member 36, as clearly shown in Fig. 7. It will thus be seen that the shipper arm 29 has no central or neutral position, the conical end of the plunger 35 engaging the inclined converging surfaces 33, 34 on the shipper arm, always maintaining the latter in one or the other of its operative positions to apply one or the other of the disc clutches. It will therefore be evident that one or the other of the disc clutches 7 and 11 is always applied, and that upon rotation of the motor power shaft 3 the terminal worm element 12 is rotated in one direction or the other, thereby effecting rotation of the worm wheel 15 to move the connecting rod and shipper arm to effect application of the other clutch. Therefore, the terminal worm element 12 is oscillated back and forth, the worm wheel 15, connecting rod 22, resilient connection between the connecting rod and the shipper arm forming a trip-motion device to effect automatically application and release of the disc clutches at timed intervals, thereby effecting oscillation of the worm wheel 13 which drives, through the ratchet and pawl mechanism mentioned above, the vertical shaft 14. Upon adjustment of the crank pin 20 toward and from the axis of the worm wheel 15 the throw thereof, and resultantly the rate of oscillation of the driven element, may be varied.

In the modified form of transmission mechanism shown in Fig. 8, there is shown keyed to the motor power shaft 3 a spur pinion 40 meshing with a spur gear 41 secured to a horizontal shaft 42. This shaft is arranged parallel with the motor power shaft and extends longitudinally of and is suitably journaled within the transmission casing. Keyed to the rear end of the shaft 42 is a bevel pinion 43 meshing with reverse bevels 44 and 45. These reverse bevels rotate in opposite directions, and are alternatively connectible by multiple disc clutches 46 and 47 to a horizontal shaft 48 extending transversely of and suitably journaled within the transmission casing. Suitably secured to the shaft 48 is a worm 49 constituting the terminal element of the transmission mechanism, and this worm meshes with a worm wheel 50 corresponding to the worm wheel 13 of the preferred form of the invention described above. As illustrated, keyed to the hub of the bevel gear 45 and rotatably mounted on the shaft 48 is a sleeve 51. Rotatably mounted on this sleeve is an eccentric or cam member 52, and this member is connectible to the sleeve by a jaw clutch 53. Mounted on and surrounding the eccentric 52 is a ring-like member 54 having threadedly connected thereto a rod 55. This rod is pivoted as by a horizontal pin 56 to a member 57 which is in turn rotatably connected as at 58 to an operating rod 59, the latter being slidably guided within upstanding bearing brackets 60, 60 suitably carried within the transmission casing. Threadedly connected to the rod 59 at 61 is an adjustable nut member 62, while connected to the outer end of this rod through a pin and slot connection 63 is an operating handle 64, and this pin and slot connection permits reciprocation of the rod 59 relative to the handle while permitting rotation of the rod by the handle. Pivotally connected at 65 to the nut member 62 is a link 66 in turn pivotally connected at 67 to a pivoted shipper arm 68 engaging a clutch applying member 69 interposed between the clutches 46, 47 and slidably mounted on the shaft 48. As shown, a resilient or yielding pivotal mounting is provided for the shipper arm 68 and herein includes a plunger member 70 to which the shipper arm is pivotally connected at 71. This plunger is provided with opposed shoulders engaging washers 72, 72, in turn engaging abutment surfaces formed on the transmission casing at the opposite ends of a chamber 73. Encircling the plunger member 70 and engaging the washers is a coil spring 74. It will thus be seen that the spring 74 is adapted to yield to permit movement of the plunger 70 in either direction. If it is desired to adjust the angular position of the shipper arm 68, this may be accomplished by grasping the handle 64 and rotating the same in the desired direction to adjust the nut member 62 relative to the operating rod 59. It will thus be seen that as the motor power shaft is rotated, the reverse bevels are driven in opposite directions and are automatically alternatively connected to the shaft 48 through the trip-motion device including the eccentric 52, operating rod 59, etc., for the shipper arm 68 thereby to effect oscillation of the terminal worm element 49.

As a result of this invention, it will be noted that an improved transmission mechanism is provided which is of a rugged and compact character particularly adapted for the purposes intended, wherein a substantial speed reduction is desired. It will further be noted that an improved speed reducing mechanism is provided wherein reversely operable driving elements are intermittently connected to a driven element, the operating means for the clutches being actuated by an element driven by said driven element whereby with an extremely simple mechanism a substantial speed reduction is obtained. It will further be noted that the improved transmission mechanism has associated therewith an improved yieldable loading means for the clutches for automatically loading the clutches at predetermined timed intervals, the clutch loading means driven from an element of the transmission drive and having associated therewith suitable adjusting means for variably tensioning aforesaid yielding connection to vary the range of actuation thereof thereby variably to load the clutches to effect intermittent drive therethrough at variable speeds. These and other advantages of the invention will, however, be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A transmission mechanism including a driven member, and motor operated driving means for said driven member including a frictional control clutch and mechanism controlled by an element of said driving means for automatically applying and releasing said clutch at timed intervals including a yieldable clutch shipper mechanism yieldable upon overload of said clutch to permit clutch slippage, and means adjustable at will during driving of said driven member for increasing or decreasing the length of said intervals to vary the driving speed.

2. A transmission mechanism including a driven member, and motor operated driving means for said driven member including a driven element, a driving element arranged coaxially with and rotatable relative to said driven element, a clutch connecting said driven element in driving relation with said driving element, and means for intermittently effecting and interrupting drive between said elements including means for automatically intermittently applying and releasing said clutch, said clutch applying and releasing means including a continuously rotatable cam member rotatable about an axis coincident with the axis of said driven element and at an equal angular rate with said driving element, and clutch applying and releasing connections actuated by said cam member, said connections including yieldable spring loaded means adapted to yield upon overload of said clutch.

3. A transmission mechanism including a driven member, and motor operated driving means for said driven member including a driven element, a driving element arranged coaxially with and rotatable relative to said driven element, a clutch connecting said driven element in driving relation with said driving element, and means for intermittently effecting and interrupting drive between said elements including means for automatically intermittently applying and releasing said clutch, said clutch applying and releasing means including a cam member, and clutch applying and releasing connections including a pivoted clutch shipper member actuated by said cam member, said connections including spring loaded yieldable means between said cam and the point on said shipper member of pressure application thereby adapted to yield upon overload of said clutch.

4. A transmission mechanism including a driven member, and motor operated driving means therefor including a driven element which itself constitutes a driver for said driven member, a driving element coaxial with said driven element, a friction clutch for connecting said elements for rotation together, and adjustable means for selectively effecting loading of said clutch to the extent necessary to effect connection of said driving and driven elements for different fractions of each revolution of the driving element to drive said driven element intermittently at variable speeds including a continuously rotatable cam member rotatable upon an axis in the same line with the axes of the driving and driven elements and at the same angular rate as the former, means for continuously rotating said cam member during drive of said driven element, and a clutch applying member actuatable by said cam member.

5. A transmission mechanism including a driven member, and motor operated driving means therefor including a driven element which itself constitutes a driver for said driven member, a driving element coaxial with said driven element, a friction clutch for connecting said elements for rotation together, and adjustable means for selectively effecting loading of said clutch to the extent necessary to effect connection of said driving and driven elements for different fractions of each revolution of the driving element to drive said driven element intermittently at variable speeds including a continuously rotatable cam member rotatable upon an axis in the same line with the axes of the driving and driven elements and at the same angular rate as the former, means for continuously rotating said cam member during drive of said driven element, and a pivotable clutch applying member actuatable by said cam member and swingable in planes parallel to the line in which the axes aforesaid lie.

6. In a transmission mechanism, the combination of a driving element, a driven element, a clutch for connecting said elements in driving relation, and means for intermittently applying and releasing said clutch to effect such connection for different fractions of each revolution of said driving element to effect intermittent variable speed rotation of said driven element including a continuously rotatable cam arranged with its axis of rotation parallel to a line parallel to the axis of said driven element and driven by said driving element, a rod actuated by said cam, and yieldable clutch loading means actuated by said rod, said clutch loading means adapted to yield upon overloading of said clutch.

7. In a transmission mechanism, the combination of a driving element, a driven element, a clutch for connecting said elements in driving relation, and means for intermittently applying and releasing said clutch at timed intervals to effect intermittent rotation of said driven element including a continuously rotatable cam driven by said driving element, a rod actuated by said cam, yieldable clutch loading means actuated by said rod, said clutch loading means adapted to yield upon overloading of said clutch, and adjustable means between said clutch loading means and said rod and adjustable at will during drive of said driven element for varying the intervals of application and release of said clutch to vary the driving speed.

8. In a transmission mechanism, the combination of a driving element, reverse gearing, a driven element, clutches controlling the connection of said reverse gearing with said driven element to effect oscillation of the latter, a continuously rotatable cam driven by said driving element, a rod actuated by said cam, yieldable spring loaded clutch applying means actuated by said rod, said loading means being yieldable upon overloading of said clutch means, and means between said rod and said clutch loading means adjustable at will during driving of said driven element to vary the time intervals of application and release of said clutches to vary the driving speed.

9. In a transmission mechanism, the combination of a driving element, a driven element, a clutch for connecting said elements in driving relation, means for effecting intermittent application and release of said clutch at timed intervals including a continuously rotatable cam driven by said driving element, a spring loaded yieldable clutch applying and releasing means actuated by said cam, and means operable at will while said cam continuously rotates for varying the range of actuation of said yieldable means to vary the time intervals of application and release of said clutch.

10. In a transmission mechanism, the combination of a driving element, a driven element arranged coaxially with said driving element and relative to which the latter is rotatable, a clutch for connecting said elements in driving relation, and means for intermittently effecting and interrupting drive between said elements including means for automatically intermittently applying and releasing said clutch at timed intervals, said clutch applying and releasing means including a continuously rotatable eccentric arranged with its axis coincident with the axis of said driven element and rotatable at an equal angular rate with said driving element, and clutch applying and releasing connections actuated by said eccentric including yieldable spring loaded means through which said clutch is applied, said yieldable means adapted to yield upon overload of said clutch, and means for varying the range of actuation of said yieldable means to vary the time intervals of application and release of said clutch.

11. In a transmission mechanism, the combination of a driving element, a driven element, a friction clutch for connecting said elements in driving relation, means for effecting intermittent application and release of said clutch at timed intervals including a continuously rotatable eccentric driven by said driving element, a spring loaded yieldable clutch applying and releasing means actuated by said eccentric, and means operable at will while said eccentric moves continuously for varying the range of actuation of said yieldable means to vary the time intervals of application and release of said clutch.

12. In a transmission mechanism, in combination, a driving element, a coaxial driven element, a friction clutch coaxial with said elements for connecting the latter in driving relation and including relatively rotatable friction clutch elements having relative axial movement, spring loaded clutch operating means actuated by an element driven by said driving element for intermittently applying and releasing said clutch at timed intervals, said clutch operating means adapted to yield upon overloading of said clutch, and means operable at will while said actuating element for said clutch operating means is continuously driven for varying the time intervals of application and release of said clutch.

MORRIS P. HOLMES.